US007002310B2

(12) United States Patent
Cavarec et al.

(10) Patent No.: US 7,002,310 B2
(45) Date of Patent: Feb. 21, 2006

(54) PIEZO-BASED ENCODER WITH MAGNETIC BRAKE FOR POWERED WINDOW COVERING

(75) Inventors: Pierre-Emmanuel Cavarec, San Diego, CA (US); Winston Glenn Walker, Littleton, CO (US)

(73) Assignee: Somfy Sas, Cluses (FR)

( * ) Notice: Subject to any disclaimer, the term of this patent is extended or adjusted under 35 U.S.C. 154(b) by 0 days.

(21) Appl. No.: 10/786,351

(22) Filed: Feb. 25, 2004

(65) Prior Publication Data

US 2005/0184691 A1   Aug. 25, 2005

(51) Int. Cl.
*H02P 3/14* (2006.01)
*H02P 3/18* (2006.01)

(52) U.S. Cl. .............. 318/375; 318/116; 318/118; 318/119; 318/376; 310/26; 310/300; 310/311; 310/316.01

(58) Field of Classification Search .......... 318/67, 318/116, 118, 119, 375, 376; 310/26, 103, 310/300, 311, 316.01, 323.12
See application file for complete search history.

(56) References Cited

U.S. PATENT DOCUMENTS

| 2,341,440 A | 2/1944 | Hammer ............... 160/298 |
| 3,104,700 A | 9/1963 | Polsky ................ 160/298 |
| 3,352,349 A | 11/1967 | Hennequin ............ 160/171 |
| 3,732,447 A * | 5/1973 | Perhats ................ 310/76 |
| 4,103,191 A | 7/1978 | Kawamura et al. ...... 310/49 R |
| 4,522,244 A | 6/1985 | Brolin ................ 160/170 |
| 4,590,814 A * | 5/1986 | Wadensten ............... 74/87 |
| 5,590,814 A | 5/1986 | Wadenstein .............. 74/87 |
| 4,623,012 A | 11/1986 | Rude et al. ............ 160/243 |
| 4,677,378 A | 6/1987 | Tokura et al. .......... 324/208 |
| 4,916,825 A | 4/1990 | Breyer ................. 33/561 |
| 4,922,198 A * | 5/1990 | Sandhagen et al. ..... 324/207.13 |
| 5,038,087 A * | 8/1991 | Archer et al. ........... 318/469 |
| 5,087,845 A | 2/1992 | Behrens ................. 310/77 |
| 5,184,660 A | 2/1993 | Jelic .................. 160/171 |
| 5,228,491 A | 7/1993 | Rude et al. ............ 160/171 |
| 5,237,861 A | 8/1993 | Suda et al. ............ 73/105 |
| 5,444,339 A | 8/1995 | Domel et al. .......... 318/77 |
| 5,467,266 A | 11/1995 | Jacobs et al. .......... 700/56 |
| 5,542,506 A | 8/1996 | McMichael et al. ...... 188/267 |
| 5,543,672 A | 8/1996 | Nishitani et al. ....... 310/77 |
| 5,714,820 A | 2/1998 | Mitsuhashi et al. ..... 310/105 |
| 5,848,634 A | 12/1998 | Will et al. ............ 160/310 |
| 6,095,223 A | 8/2000 | Rossini et al. ......... 160/107 |
| 6,316,862 B1 * | 11/2001 | Nakata et al. ......... 310/316.02 |
| 6,332,491 B1 | 12/2001 | Rossini ................ 160/107 |
| 6,714,733 B1 | 3/2004 | Kobayashi ............. 396/133 |

(Continued)

FOREIGN PATENT DOCUMENTS

DE     3232820     0/1984

(Continued)

*Primary Examiner*—David Martin
*Assistant Examiner*—Tyrone Smith
(74) *Attorney, Agent, or Firm*—Frommer Lawrence & Haug LLP; Ronald R. Santucci

(57) ABSTRACT

The position and speed and, in some embodiments, direction of rotation of a motor for turning the rod of an object such as a window covering is determined by placing a braking magnet next to the motor and a piezoelectric element between the braking magnet and motor. As the motor rotates, the piezoelectric element generates a signal that can be used to determine the speed of rotation and also the position of the motor (and, hence, the position of the object being moved). The magnet brakes the motor from turning under the weight of the object when the motor is deenergized.

17 Claims, 4 Drawing Sheets

U.S. PATENT DOCUMENTS 6,870,338 B1 * 3/2005 Walker et al. .............. 318/466
6,924,615 B1 * 8/2005 Cavarec et al. ............. 318/466

FOREIGN PATENT DOCUMENTS

| DE | 29509638 U1 | 11/1996 |
|----|-------------|---------|
| EP | 0 182 997 | 9/1985 |
| EP | 0381643 A1 | 8/1990 |
| EP | 0859224 A2 | 8/1998 |
| JP | 29028 | 0/1983 |
| JP | 109484 | 0/1985 |
| JP | 192987 | 0/1989 |
| JP | 363495 | 0/1992 |

* cited by examiner

PIEZO-BASED ENCODER WITH MAGNETIC BRAKE FOR POWERED WINDOW COVERING

FIELD OF THE INVENTION

The present invention relates generally to motorized window coverings, awnings, security screens, projection screens, and the like.

BACKGROUND OF THE INVENTION

The present assignee has provided several systems for either lowering or raising a window covering, or for moving the slats of a window covering between open and closed positions, under control of a hand-held remote or other control device. These systems include a motor that is coupled through gears to the window covering activation mechanism. When the motor is energized in response to a user command signal, the activation mechanism moves the window covering. Such assemblies are disclosed in U.S. Pat. No. 6,433,498, incorporated herein by reference.

The present assignee has also provided systems for determining the position of the window coverings based on counting motor pulses, and for braking the motor from turning when it is not energized. By knowing the position of the window coverings, features such as automatic repositioning the window covering to a preset position can be provided. The present invention likewise provides structure and methods for braking an object in the absence of power and also for determining the position of an object by outputting a signal the amplitude of which is substantially independent of motor speed.

SUMMARY OF THE INVENTION

A powered assembly includes an object that can be moved between a first configuration and a second configuration. The object may be selected from the group consisting of window coverings, awnings, skylight coverings, curtains, and screens. A motor is provided, and an actuator is coupled to the motor and the object to move the object when the motor is energized. The motor turns a rotating member. At least one magnet is juxtaposed with the rotating member and is magnetically coupled thereto. Also, at least one piezoelectric element cooperates with the magnet to output signals when the rotating member rotates. The signals are useful in determining at least one of: a position, and a speed of rotation, of the motor. Advantageously, the magnet magnetically brakes the rotating member from turning when the motor is deenergized.

In a preferred embodiment, when the direction of rotation of the motor is not known a priori from, e.g., a user command signal of "OPEN" or "CLOSE", the assembly can include a second magnet and a second piezoelectric element interposed between the rotating member and second magnet and oriented in quadrature with the first piezoelectric element. In another embodiment, an elongated asymmetric ferromagnetic shaft can be coupled to a rotor of the motor by a vibration damping member, with the piezoelectric element being juxtaposed with the shaft and hence being shielded from motor vibrations.

In another aspect, a drive assembly for a movable object including a rod includes an electrically-powered drive structure couplable to the rod to move the object when the drive structure is energized. The drive structure has a rotating component, at least a part of which contains ferromagnetic material. At least one braking magnet is closely spaced from the rotating member, and a piezoelectric element is juxtaposed with the magnet for generating a signal as the rotating member moves past the magnet. The signal is representative of at least of a position of the rotating member.

In yet another aspect, a method is disclosed for operating an object that can be moved between a first configuration and a second configuration. The object is selected from the group consisting of window coverings, awnings, skylight coverings, curtains, and screens. The method includes providing a drive structure, coupling the drive structure to the object such that the object is moved when the drive structure is energized, and closely juxtaposing at least one magnet with the drive structure. The method also includes using the magnet to brake the drive structure when the drive structure is not energized, and piezoelectrically generating signals when the drive structure rotates past the magnets to determine at least one of: a position of the drive structure, and a speed of the drive structure.

The details of the present invention, both as to its construction and operation, can best be understood in reference to the accompanying drawings, in which like numerals refer to like parts, and which:

DETAILED DESCRIPTION OF THE PREFERRED EMBODIMENT

Figure 1:
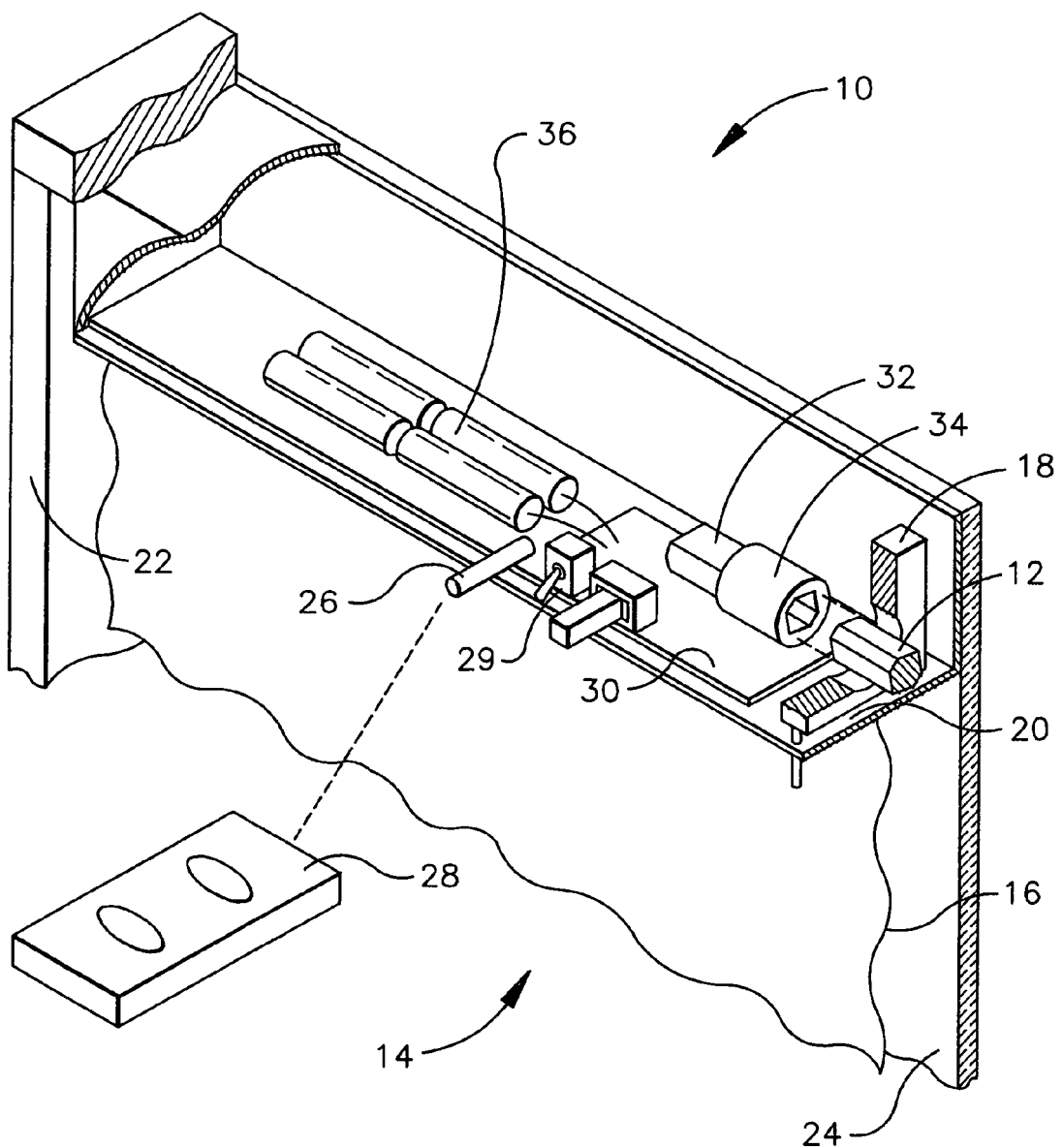
FIG. 1 is a perspective view of a window covering actuator, shown in one intended environment, with portions of the head rail cut away.

Referring initially to FIG. 1, a motorized window covering is shown, generally designated 10, that includes an actuator such as a rotatable rod 12 of a window covering 14, such as but not limited to a shade assembly having raisable (by rolling up) and lowerable (by rolling down, or unrolling) shade 16. As shown, the tilt rod 12 is rotatably mounted by means of a block 18 in a head rail 20 of the window covering 14.

While a roll-up shade is shown, it is to be understood that the principles herein apply to a wide range of window coverings and other objects that are to be moved by motors. For example, the invention applies to raisable and lowerable pleated shades and cellular shades such as those commonly marketed under the trade names "Silhouette", "Shangri-La", etc. as well as to projector screens, awnings, etc. that can be raised and lowered. Moreover, while needed less in applications that require only tilting slats such as in horizontal blinds, the invention may also apply to these systems. Thus, for example, the rod 12 may be a roll-up rod of a shade, awning, or projector screen, or a tilt rod of a horizontal (or vertical) blind, or other like operator. It is thus to be further understood that the principles of the present invention apply to a wide range of window coverings and other objects including, but not limited to the following: vertical blinds, fold-up pleated shades, roll-up shades, cellular shades, skylight covers, etc. Powered versions of such shades are disclosed in U.S. Pat. No. 6,433,498, incorporated herein by reference.

In the non-limiting illustrative embodiment shown, the window covering 14 is mounted on a window frame 22 to cover a window 24, and the rod 12 is rotatable about its longitudinal axis. The rod 12 can engage a user-manipulable baton (not shown). When the rod 12 is rotated about its longitudinal axis, the shade 16 raises or lowers between an open configuration and a closed configuration.

FIG. 1 shows that the actuator 10 can include a control signal generator, preferably a signal sensor 26, for receiving a user command signal. Preferably, the user command signal is generated by a hand-held user command signal generator 28, which can be an infrared (IR) remote-control unit or a radio frequency (RF) remote-control unit. Or, the user command signal may be generated by any other means of communication well known in the art, such as by manipulable manual switches 29. The user command signals can include open, close, raise, lower, and so on.

An electronic circuit board 30 can be positioned in the head rail 20 and can be fastened to the head rail 20, e.g., by screws (not shown) or other well-known method. The preferred electronic circuit board 30 includes a microprocessor for processing the control signals. Also, the circuit board 30 includes appropriate signal conditioning circuitry that is electrically connected to the below-disclosed pickup coils for processing signals from the coils and sending the signals to the processor on the circuit board 30 for determining the position and/or speed and/or direction of rotation of the below-described motor as set forth further below.

Indeed, FIG. 1 shows that a small, lightweight electric motor/encoder 32 is coupled to a gear enclosure 34, preferably by bolting the motor 32/encoder to the gear enclosure 34. The gear enclosure 34 is keyed to the rod 12, so that as the gears in the gear enclosure 34 turn, the rod 12 rotates.

It is to be understood that the motor/encoder 32 is electrically connected to the circuit board 30. To power the motor/encoder 32, one or more (four shown in FIG. 1) primary dc batteries 36, such as type AA alkaline batteries or Lithium batteries, can be mounted in the head rail 20 and connected to the circuit board 30. Preferably, the batteries 36 are the sole source of power for the motor, although the present invention can also be applied to powered shades and other objects that are energized from the public ac power grid.

As set forth in the above-referenced U.S. Patent, a user can manipulate the signal generator 28 to generate a signal that is sensed by the signal sensor 26 and sent to signal processing circuitry in the circuit board 30. In turn, the electrical path between the batteries 34 and the motor/ encoder 32 is closed to energize the motor 32 and move the window covering open or closed in accordance with the signal generated by the signal generator 28, under control of the processor on the electronic circuit board 30. As set forth further below, as the motor turns, the encoder portion generates a signal representative of the speed, direction, and position of the motor. When the motor is deenergized, the encoder portion advantageously brakes the motor from turning under the weight of the window covering 14.

Figure 2:
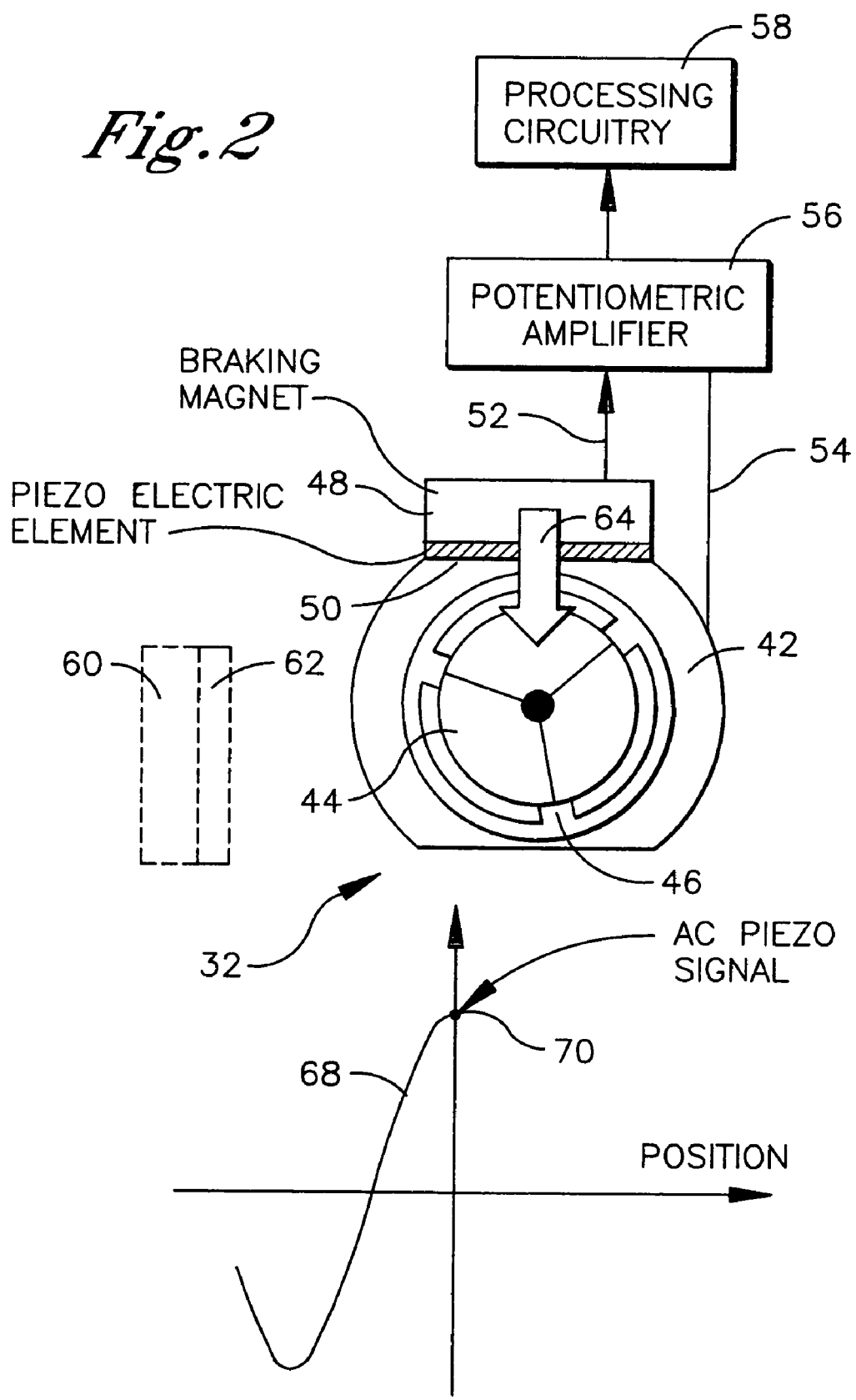
FIG. 2 is a schematic elevational view of the motor in a position wherein maximum magnetic attraction exists between the rotor and braking magnet as schematically shown by the down arrow, showing the braking magnet and piezoelectric element and showing a graph of the signal that is generated by the piezoelectric element as the motor turns.
Figure 3:
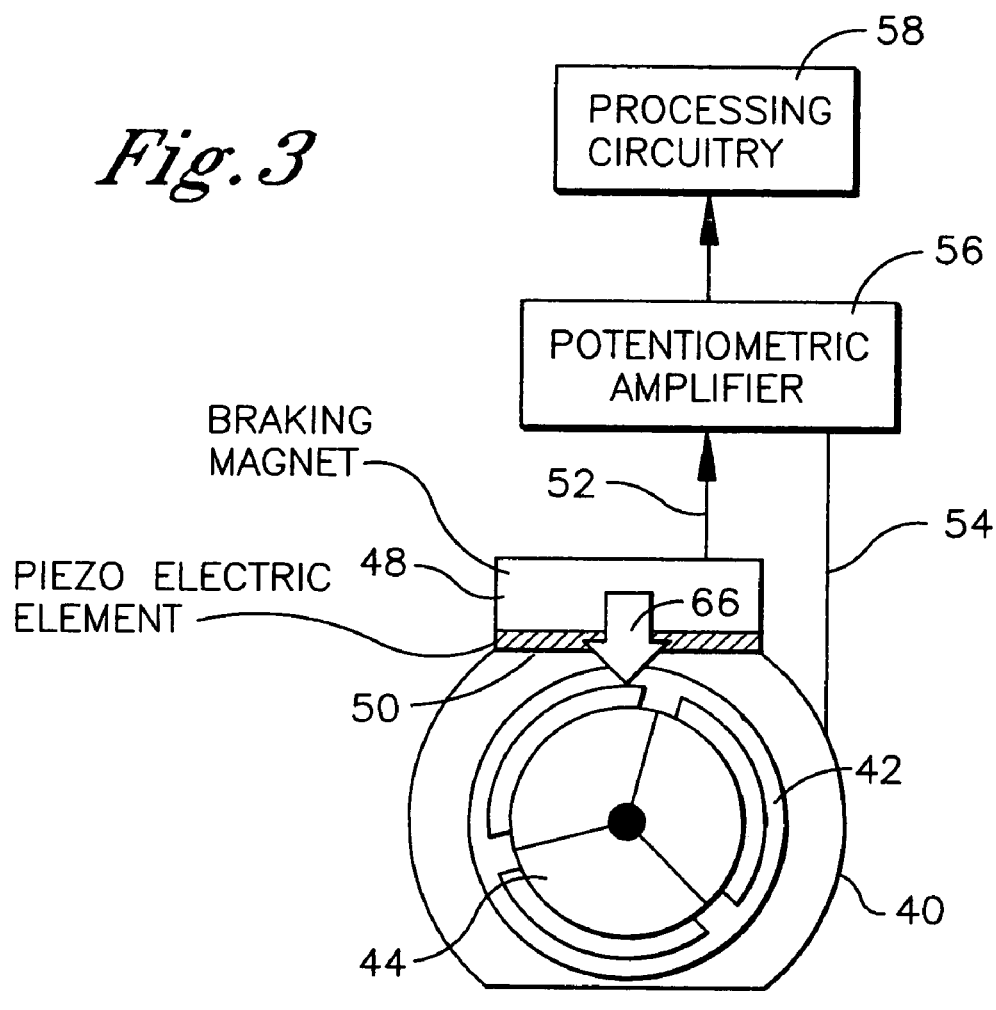
FIG. 3 is a schematic elevational view of the motor in a position wherein minimum magnetic attraction exists between the rotor and braking magnet as schematically shown by the down arrow, showing a graph of the signal that is generated by the piezoelectric element as the motor turns.

Now referring to FIGS. 2 and 3, in one non-limiting implementation the motor/encoder 32 includes a motor housing 42 inside of which a rotor 44 may rotate. The rotor 44 may have, e.g., three poles 46. A braking magnet 48 is closely juxtaposed with the motor such that as the poles of the rotor 44 rotate past the magnet 48, magnetic field lines are cut. The braking magnet 48 may be magnetically coupled to another stationary magnet or ferromagnetic object (not shown). Plural (e.g., three) magnets or ferromagnetic objects may be attached to the rotor as, e.g., rotor poles so that the reluctance of the coupling between the braking magnet 48 and the rotor 46 varies with rotation.

As intended by the present invention, a piezoelectric element 50 such as a disk-shaped piezoelectric element is interposed between the magnet 48 and rotor 44. In the embodiment shown, the piezoelectric element 50 is mounted on the outer surface of the motor housing 42 and the magnet 48 is mounted on the piezoelectric element 50. The piezoelectric element 50 may alternatively be mounted on the inside surface of the housing 42.

As shown in FIGS. 2 and 3, signals generated by the piezoelectric element 50 can be picked up by leads 52, 54 respectively connected to the magnet 48 and housing 42. The leads 52, 54 can be connected to a suitable circuit that can include, e.g., an amplifier 56, preferably configured potentiometrically, and digital or analog processing circuitry 58 that processes the signals in accordance with the disclosure below to determine the angular speed and position of the motor/encoder 32. If desired, as shown in phantom in FIG. 2 a second magnet 60 with second piezoelectric element 62 can be mounted on the motor in quadrature with (offset 90 degrees from) the previously described piezoelectric element 50, for determining the direction of rotation of the motor if desired. Often, however, the direction of rotation is known a priori because the user command signals represent the desired direction of rotation by, e.g., indicating whether the window covering is to be opened or closed.

When a pole 46 is directly beneath the magnet 48 as shown in FIG. 2, the magnetic coupling between the magnet 48 and rotor 44 is at a maximum, as indicated by the relatively large arrow 64. In contrast, when the two nearest poles 46 of the motor are equidistantly spaced from the magnet 48, the magnetic coupling between the magnet 48 and rotor 44 is at a minimum, as indicated by the relatively small arrow 66 in FIG. 3. The variability of the magnetic coupling as the motor turns exerts a changing force on the piezoelectric element 50, causing it to generate a varying electrical signal.

This is illustrated by the graphs in FIGS. 2 and 3. As shown in FIGS. 2 and 3, a varying signal 68 is output by the piezoelectric element 50, with the signal 68 being sinusoidal and varying with rotor 44 position. Specifically, when the rotor 44 is in the position of maximum magnetic coupling shown in FIG. 2, the signal 68 is at a positive peak 70, and when the rotor 44 is in the position of minimum magnetic coupling shown in FIG. 3, the signal 68 is at a negative peak 72. The graphs accordingly show that the amplitude of the signal, which advantageously is substantially independent of motor speed, is correlated to position along the x-axis.

Thus, one-half wave of the signal 68 represents the angular distance between adjacent poles 46 of the rotor 44; the instantaneous amplitude of the signal 68 accordingly gives the instantaneous angular position relative to adjacent poles 46. The number of peaks can be counted UP or DOWN (depending on direction of rotation) to know the total angular displacement of the motor from an initialized value of zero, which value can be established by running the window covering to, e.g., fully closed and resetting the circuit to indicate a "zero" position. The speed of the motor can be determined from the frequency of the signal 68. One way to obtain the speed in revolutions per second is to count the time between positive peaks, multiply by three, and take the inverse of the product. To obtain the direction of rotation, the user command signal of "UP" or "DOWN" (equivalently, "OPEN" or "CLOSE") can be used. If the direction cannot be so obtained, the signal from the second piezoelectric element 62 can be used in conjunction with the signal from the first piezoelectric element 50 in accordance with quadrature principles known in the art to obtain the direction of rotation.

Figure 4:
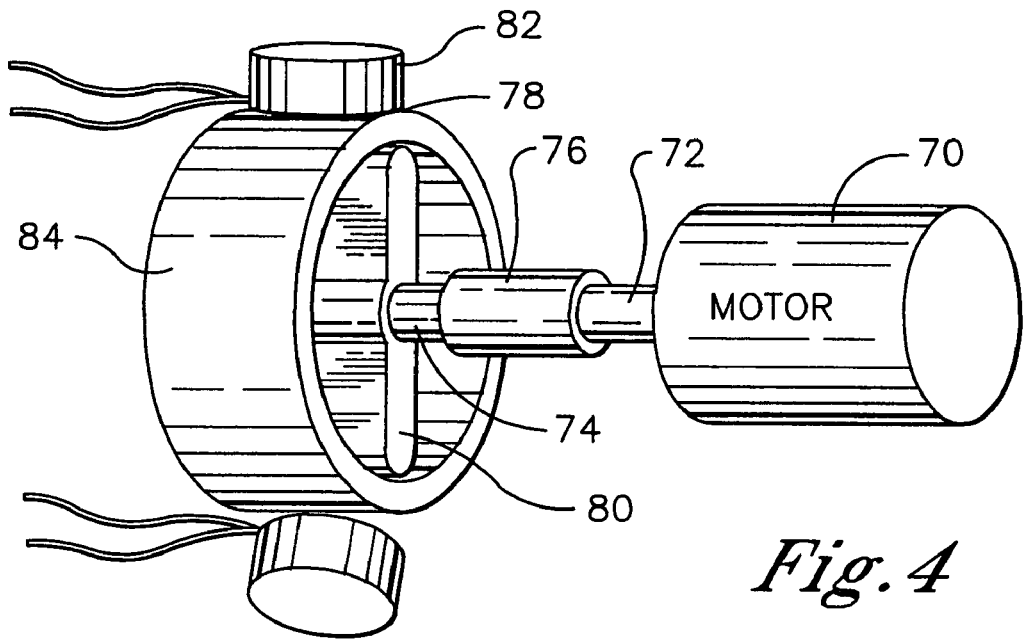
FIG. 4 is a view of an alternate embodiment wherein the piezoelectric element and braking magnet sense the rotation of a shaft that is connected to the motor rotor by a vibration damping member.

FIG. 4 shows an alternate embodiment of a motor 70 that, instead of mounting the piezoelectric element on the motor housing (which can vibrate and hence induce noise in the output of the piezoelectric element), couples a rotor 72 of the motor 70 to a ferromagnetic shaft 74 using a vibration damping coupling 76 that can be as simple as a plastic tube which closely surrounds the shaft 74 and rotor 72. The shaft 74 can be made of soft or powdered iron. A piezoelectric element 78 is sandwiched between poles 80 of the shaft 74 and a braking magnet 82 as shown, to function in accordance with principles set forth above to determine the position and speed of the motor 70. Specifically, the piezoelectric element 78 is mounted on a housing 84 that surrounds the shaft 74 and that is not connected to the motor housing.

In an alternate application, the signals from the piezoelectric element 50 can be used to self-commute the motor when it is a brushless DC motor. In some instances, the magnets can be used to create the magnetic field in the motor, such as a linear motor.

Figure 5:
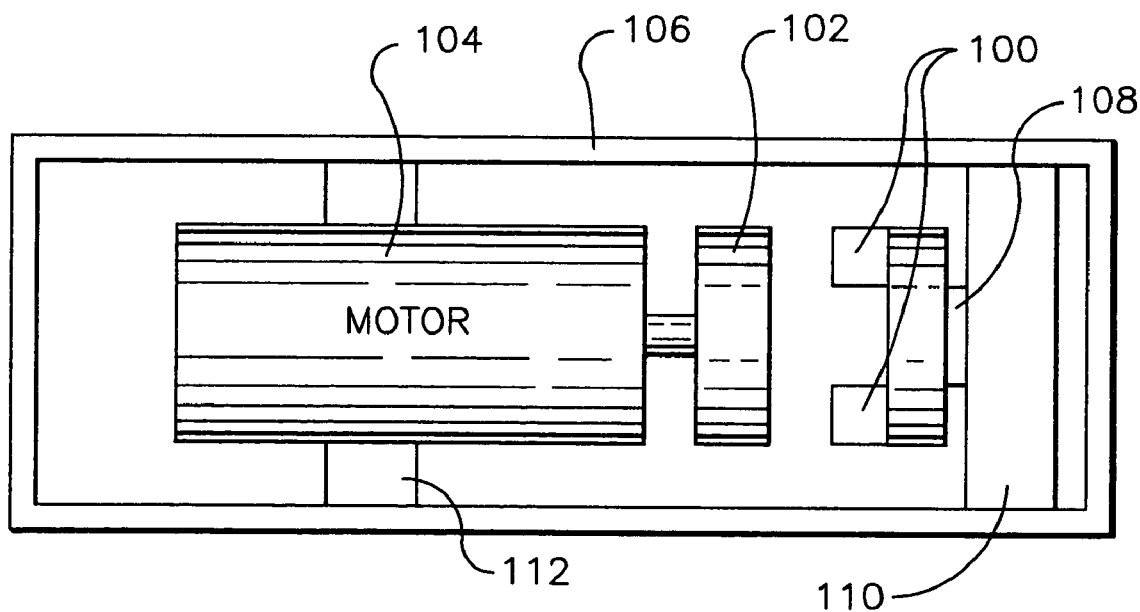
FIG. 5 is a side view of another alternate embodiment wherein the piezoelectric element is placed behind the magnetic circuit.

FIG. 5 shows another alternate embodiment wherein magnets 100 are disposed in front of motor poles 102 of a motor 104 within a housing 106. A piezoelectric element 108 is separated from the magnets 100 by a plastic holder 110 within the housing 106. The motor 104 can be held by a holder 112 within the housing 106. The piezoelectric element 108 transfers the force of the magnets 100 to the housing 106. The force generated by the magnets 100 depends on the position of the shaft of the motor 104, and is at a maximum when they are aligned with the shaft. This force is directly sensed by the piezoelectric element 108, and as a consequence the output of the element 108 can be correlated to motor position and, hence, used to determine shaft rotational position. The output of the element 108 has two pulses per motor revolution. If desired, a second piezoelectric element can be juxtaposed in quadrature with the element 108 so that two outputs can be obtained for determining position, direction, and speed of rotation.

While the particular ENCODER WITH MAGNETIC BRAKE FOR POWERED WINDOW COVERING as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A powered assembly, comprising:
   at least one object that can be moved between a first configuration and a second configuration, the object being selected from the group consisting of window coverings, awnings, skylight coverings, curtains and screens;
   at least one motor including a rotor and a stator;
   at least one actuator, coupled to the motor and the object, to move the object when the motor is energized;
   at least one magnet mounted on the stator, juxtaposed with the rotor and magnetically coupled thereto; and
   at least one piezoelectric element that transfers the force of the magnet to output signals when the rotor rotates, the signals being useful in determining at least one of: a position, and a speed of rotation, of the motor, the magnet magnetically braking the rotor from turning when the motor is deenergized.

2. The powered assembly of claim 1, wherein the magnet is a first magnet, the piezoelectric element is a first piezoelectric element, and the assembly further comprises a second magnet and a second piezoelectric element interposed between the rotor and second magnet and oriented in quadrature with the first piezoelectric element.

3. The powered assembly of claim 1, wherein the motor is powered by at least on dc battery.

4. The powered assembly of claim 1, wherein the object is selected from the group consisting of window coverings, awnings, skylight coverings, curtains and screens.

5. The powered assembly of claim 1, wherein the piezoelectric element outputs a variable signal as a function of angular position of the rotor.

6. A drive assembly for a movable object including a rod, comprising:
   an electrically-powered drive structure couplable to the rod to move the object when the drive structure is energized, the drive structure having a motor including a rotor and a stator;
   at least one braking magnet mounted on the stator and closely spaced from the rotor; and
   at least one piezoelectric element juxtaposed with the magnet and generating a signal as the rotor moves past the magnet, the signal being representative at least of a position of the rotor.

7. The assembly of claim 6 wherein the drive situation is powered by at least one dc battery.

8. The assembly of claim 7 wherein the object is selected from the group consisting of window coverings, awnings, skylight coverings, curtains, and screens.

9. The assembly of claim 6, wherein the magnet is magnetically coupled to the rotor sufficiently to stop the rotor from rotating when the drive is structured is deenergized.

10. The drive assembly of claim 6 wherein the magnet is a first magnet, the piezoelectric element is a first piezoelectric element, and the assembly further comprises a second magnet and a second piezoelectric element interposed between the rotor and second magnet and oriented in quadrature with the first piezoelectric element.

11. The powered assembly of claim 6, wherein the piezoelectric element outputs a variable signal as a function of angular position of the rotor.

12. A method of operating an object that can be moved between a first configuration and a second configuration, the object being selected from the group consisting of window coverings, awnings, skylight coverings, curtains, and screens, the method comprising:
   providing a motor including a rotor and a stator;
   coupling the rotor to the object such that the object is moved when the rotor is energized;
   mounting at least one magnet on the stator and closely juxtaposing the at least one magnet with the rotor;
   using the magnet to brake the drive structure when the rotor is not energized; and
   piezoelectrically generating signals when the rotor rotates past the magnets to determine at least one of: a position of the rotor, and a speed of the rotor.

13. The method of claim 12, comprising determining a position of the rotor at least in part based on a amplitude of a signal from a piezoelectric element.

14. The method of claim 12, comprising determining a speed of rotation of the rotor at least in part based on a frequency of a signal form a piezoelectric element.

15. The method of claim 12, comprising providing two piezoelectric elements outputting respective signals and using the signals to determine a direction of rotation of the rotor.

16. The method of claim 12, comprising attenuating motor vibrations transmitted to a piezoelectric element.

17. The method of claim 12, comprising powering the object solely by means of at least one primary dc battery.

* * * * *